(12) United States Patent
Osaku et al.

(10) Patent No.: US 8,496,888 B2
(45) Date of Patent: Jul. 30, 2013

(54) REDUCING AGENT CONTAINER HAVING AN IMPROVED STRUCTURE

(75) Inventors: Yasushi Osaku, Ageo (JP); Kiyoshi Fukuda, Ageo (JP); Toshio Kondou, Ageo (JP)

(73) Assignee: Nissan Diesel Motor Co., Ltd., Saitama (JP)

( * ) Notice: Subject to any disclaimer, the term of this patent is extended or adjusted under 35 U.S.C. 154(b) by 1272 days.

(21) Appl. No.: 11/788,245

(22) Filed: Apr. 18, 2007

(65) Prior Publication Data

US 2007/0196243 A1 Aug. 23, 2007

Related U.S. Application Data

(63) Continuation of application No. PCT/JP2005/017292, filed on Sep. 20, 2005.

(30) Foreign Application Priority Data

Oct. 18, 2004 (JP) .................................. 2004-303462

(51) Int. Cl.
*A61L 2/04* (2006.01)
*F01N 3/10* (2006.01)
*B01L 99/00* (2010.01)
(52) U.S. Cl.
USPC ........... 422/307; 123/490; 210/175; 210/439; 422/105; 422/106; 422/173; 422/547; 422/550
(58) Field of Classification Search .................. 123/590; 423/239.1, 235, 212; 210/439, 175; 422/102
See application file for complete search history.

(56) References Cited

U.S. PATENT DOCUMENTS 1,689,979 A 10/1928 Homer et al.
1,702,532 A 2/1929 Boomer et al.
(Continued)

FOREIGN PATENT DOCUMENTS

FR 557305 8/1923
FR 2564147 11/1985
(Continued)

OTHER PUBLICATIONS

Notice of Reasons of Rejection of the present invention of Japanese Patent Application No. 2004-303462.

*Primary Examiner* — Dirk Bass
(74) *Attorney, Agent, or Firm* — McDermott Will & Emery LLP

(57) ABSTRACT

A reducing agent container having a multi-function and having a container body thereof is provided with at least a heat exchanger which permits a heating medium using an engine as a heat source thereof to circulate therein for performing the heat exchange with a liquid reducing agent and a strainer which filtrates foreign substances from the liquid reducing agent, the heat exchanger and the strainer being attached to a top board of the container body. Further, a suction pipe capable of sucking the liquid reducing agent from the inside of the container body is connected to the strainer, and a supply port for the liquid reducing agent from which the foreign substances are filtrated is formed in the strainer. Thus, the whole of strainer is not exposed to the outside air, especially, the wind during traveling, and accordingly, the freezing of the urea aqueous solution in the strainer can be suppressed. Accordingly, even in a cold region, it is possible to achieve a function of effective filtration of the urea aqueous solution and a function of suppressing the freezing of the urea aqueous solution.

5 Claims, 9 Drawing Sheets

U.S. PATENT DOCUMENTS

| | | | |
|---|---|---|---|
| 1,747,200 A | | 2/1930 | White |
| 1,902,456 A | | 3/1933 | Matthews |
| 1,936,207 A | | 11/1933 | Penn |
| 1,989,300 A | | 1/1935 | Webb |
| 2,041,387 A | | 5/1936 | Adams |
| 2,101,348 A | | 12/1937 | Schellinger |
| 2,294,922 A | | 9/1942 | Malluk |
| 3,035,732 A | | 5/1962 | Baker |
| 3,394,836 A | | 7/1968 | Millard |
| 3,477,607 A | | 11/1969 | Johnson |
| 3,630,407 A | | 12/1971 | Mross |
| 3,930,388 A | | 1/1976 | Barras |
| 4,186,843 A | | 2/1980 | Omori |
| 4,254,888 A | | 3/1981 | Chandler |
| 4,370,919 A | | 2/1983 | Wagner |
| 4,411,788 A | * | 10/1983 | Kimura ................ 210/439 |
| 4,865,006 A | * | 9/1989 | Nogi et al. ............. 123/590 |
| 4,887,669 A | | 12/1989 | Paulus |
| 4,984,698 A | | 1/1991 | Stuckey |
| 4,986,097 A | | 1/1991 | Derman |
| 5,464,109 A | | 11/1995 | Greenwald |
| 6,063,350 A | | 5/2000 | Tarabulski et al. |
| 2004/0177606 A1 | | 9/2004 | Scharsack |

FOREIGN PATENT DOCUMENTS

| | | |
|---|---|---|
| GB | 974243 | 11/1964 |
| JP | 47-10575 | 4/1972 |
| JP | 48-77510 | 9/1973 |
| JP | S59-517 | 1/1984 |
| JP | 3-34934 | 4/1991 |
| JP | 06-173656 | 6/1994 |
| JP | 3011991 | 3/1995 |
| JP | 7-47218 | 11/1995 |
| JP | 11-028941 | 2/1999 |
| JP | 2000-027627 | 1/2000 |
| JP | 2001-120920 | 5/2001 |
| JP | 2002-527660 | 8/2002 |
| JP | 2003-042031 | 2/2003 |
| JP | 2003-083187 | 3/2003 |
| JP | 2003-314252 | 11/2003 |
| JP | 2004-529286 | 9/2004 |
| WO | WO 00/21881 | 4/2000 |

* cited by examiner

REDUCING AGENT CONTAINER HAVING AN IMPROVED STRUCTURE

This application is a continuation of PCT/JP2005/017292, filed on Sep. 20, 2005.

BACKGROUND OF THE INVENTION

1. Field of the Invention

The present invention relates generally to an exhaust emission purifying apparatus for reductively purifying nitrogen oxides ($NO_x$) in the exhaust gas using the liquid reducing agent, and in particular, to a technology especially for achieving the effective filtration of a liquid reducing agent while suppressing the freezing thereof in a reducing agent container. The present invention further relates to the reducing agent container having an improved structure thereof capable of realizing the effective filtration of a liquid reducing agent while suppressing the freezing thereof.

2. Description of the Related Art

Japanese Unexamined Patent Publication No. 2000-27627 discloses an exhaust emission purifying apparatus as one proposal for a catalytic converter purifying system for eliminating $NO_x$ contained in the exhaust gas of an engine. In such an exhaust emission purifying apparatus, a liquid reducing agent according to engine operating conditions is injection-supplied to the flow of the exhaust emission in an upstream portion of a reduction catalytic converter disposed in an engine exhaust emission system via a reducing agent supply device which is controlled by a control unit, so that $NO_x$ in the exhaust gas and the liquid reducing agent are subjected to the catalytic-reduction reaction, to thereby purify $NO_x$ into harmless components. Here, for the reduction reaction, ammonia having the good reactivity to $NO_x$ is used, and as the liquid reducing agent, the urea aqueous solution, which is hydrolyzed with the exhaust heat and the water vapor in the exhaust gas to generate ammonia, is used.

However, when foreign substances are mixed into the liquid reducing agent, a strainer incorporated in the reducing agent supply device is clogged in a short time, resulting in that the liquid reducing agent cannot be successfully injection-supplied to the exhaust upstream of the reduction catalytic converter. As foreign substance mixing routes, there can be assumed various situations, such as, spatters during the manufacturing process of the reducing agent container, mixing of fibrous material having detached from an operator's glove or various insects when the liquid reducing agent is replenished, and the like.

There is known a technology for disposing a strainer in engine fuel piping. However, if this known technology is applied to the exhaust emission purifying apparatus without any modification, there is caused the following problem. Namely, in a cold region, such as Hokkaido island of Japan, if a moving vehicle mounted with the exhaust emission purifying apparatus travels, since the whole of strainer is exposed to the wind during traveling, there is a possibility that the liquid reducing agent in the strainer might be frozen. If the liquid reducing agent in the strainer is frozen, the liquid reducing agent cannot be successfully injection-supplied to the exhaust upstream of the reduction catalytic converter, resulting in that a function of the exhaust emission purifying apparatus cannot be achieved. Further, a consideration could be made on a configuration in which the strainer is attached to a replenishment port for the reducing agent container. However, since there is a possibility that the strainer is broken at the time of replenishment, such a configuration is not adoptable in easy.

SUMMARY OF THE INVENTION

Therefore, in view of the above conventional problems, the present invention has an object to provide a reducing agent container having an improved structure, which can achieve effective filtration of a liquid reducing agent while suppressing the freezing thereof, by reviewing and reconsidering the design of a mounting structure of a strainer which filtrates foreign substances from the liquid reducing agent.

In order to achieve the above object, a reducing agent container having an improved structure according to the present invention includes a container body, at least a heat exchanger which allows a heating medium using an engine as a heat source thereof to circulate therein thereby performing the heat exchange with a liquid reducing agent, and a strainer which filtrates foreign substances from the liquid reducing agent, the heat exchanger and the strainer being attached to a top board of the container body, in which the strainer is provided with a suction pipe connected thereto to such, the liquid reducing agent from an inside of the container body and a supply port formed in the strainer for supplying from the reducing agent container the liquid reducing agent after the foreign substances are filtrated therefrom.

According to the reducing agent container having the multi-function structure in accordance with the present invention, since the strainer which exhibits a function of filtrating the foreign substances from the liquid reducing agent is attached to the top board of the container body, a major portion of the strainer is accommodated in the inside of the reducing agent container. Therefore, the whole of strainer is not exposed to the outside air, in particular, the wind during traveling of a vehicle, which might act as a heat-removing agent and consequently, it is possible to prevent the liquid reducing agent in the strainer from freezing. Accordingly, even in a cold region, it is possible to achieve the effective filtration of the liquid reducing agent while suppressing the freezing thereof. Namely, an improved function can be exhibited by the reducing agent container of the present invention.

The other objects, features and advantages of the present invention will be made apparent from the ensuing description with reference to the accompanying drawings.

DESCRIPTION OF THE PREFERRED EMBODIMENTS

Hereunder, there will be described several embodiments of the present invention with reference to the accompanying drawings.

Figure 1:
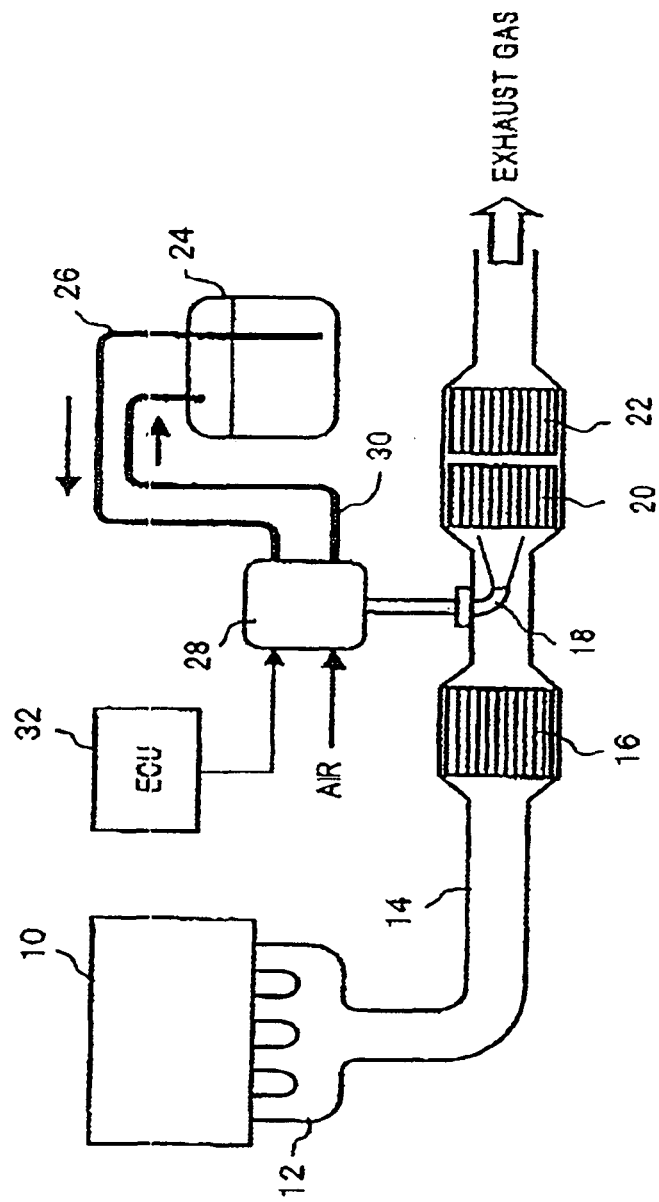
FIG. 1 is an overall configuration diagram of an exhaust emission purifying apparatus to which the present invention is to be applied.

FIG. 1 shows an overall configuration of an exhaust emission purifying apparatus for purifying $NO_x$ contained in the exhaust gas of an engine by the catalytic-reduction reaction, using the urea aqueous solution as a liquid reducing agent.

In an exhaust pipes 14 connected to an exhaust manifold 12 of an engine 10, there are disposed respectively, along an exhaust gas flow direction, a nitrogen oxidation catalytic converter 16 for oxidizing nitrogen monoxide (NO) into nitrogen dioxide ($NO_2$), an injection nozzle 18 for injection-supplying the urea aqueous solution, a $NO_x$ reduction catalytic converter 20 for reductively purifying $NO_x$ with ammonia obtained by hydrolyzing the urea aqueous solution, and an ammonia oxidation catalytic converter 22 for oxidizing ammonia passed through the $NO_x$ reduction catalytic converter 20. Further, the urea aqueous solution preserved in a reducing agent container 24 is supplied to a reducing agent supply device 28 via supply piping 26 of which suction port is positioned on a bottom portion of the reducing agent container 24, while the surplus urea aqueous solution which did not contribute to the injection in the reducing agent supply device 28 being returned into an upper space of the reducing agent container 24 via return piping 30. Then, the reducing agent supply device 28 s controlled by a control unit 32 incorporating therein an electronic computer, to supply the urea aqueous solution according to engine operating conditions to the injection nozzle 18 while mixing the urea aqueous solution with air.

In such an exhaust emission purifying apparatus, the urea aqueous solution injection-supplied from the injection nozzle 18 is hydrolyzed with the exhaust heat and the water vapor in the exhaust gas to generate ammonia. It is known that generated ammonia reacts with $NO_x$ in the exhaust gas in the $NO_x$ reduction catalytic converter 20 to be purified into water and harmless gas. At this time, in order to improve the $NO_x$ purification efficiency, NO is oxidized into $NO_2$ by the nitrogen oxidation catalytic converter 16, so that a rate between NO in the exhaust gas and $NO_2$ therein is improved to be suitable for the catalytic-reduction reaction. Further, ammonia passed through the $NO_x$ reduction catalytic converter 20 is oxidized by the ammonia oxidation catalytic converter 22 disposed on the exhaust downstream of the $NO_x$ reduction catalytic converter 20, and therefore, it is possible to prevent ammonia from being discharged into the atmosphere just as it is.

Figure 2:
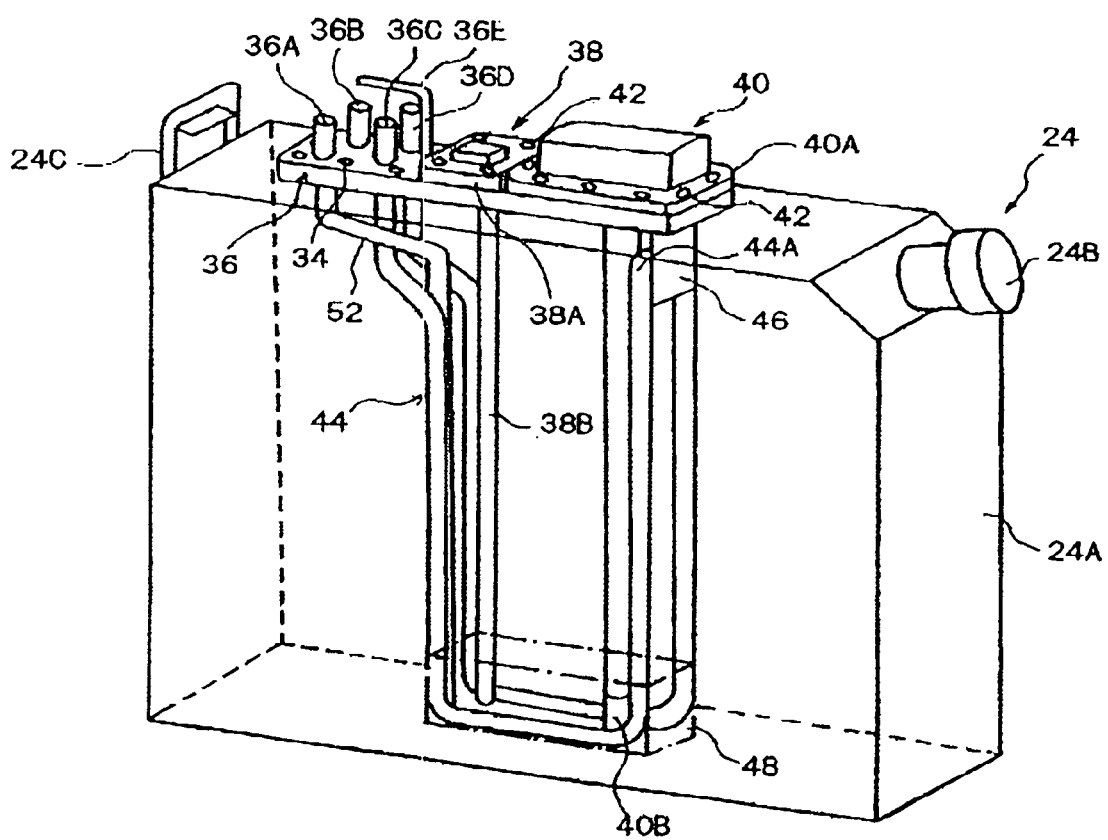
FIG. 2 is a perspective view showing a reducing agent container and an internal arrangement thereof to which the present invention is applicable.

In the reducing agent container 24, as shown in FIG. 2, on upper side face portions forming bifacial widths in a longitudinal direction of a container body 24A in approximately rectangular shape, there are disposed respectively a replenishment port 24B for replenishing the urea aqueous solution and a handle 24C which is to be held when carrying the reducing agent container 24. Further, on an upper surface of the container body 24A, an opening portion (not shown in the figure) is formed, and a top lid 36 (top board) is detachably fastened by means of a plurality of bolts 34 so as to cover the opening portion.

On an upper surface of the top lid 36, from one end portion to a center portion in a longitudinal direction thereof, there are formed a supply port 36A and a return port 36B for the urea aqueous solution, an inlet port 36C and an outlet port 36D for the engine coolant as a heating medium using the engine as a heat source, and an opening port 36E for opening the internal upper space of the reducing agent container 24 to the atmosphere. Further, on the top lid 36, from the center portion to the other end portion in the longitudinal direction thereof, a base portion 38A of a water gauge 38 which detects a residual amount of the urea aqueous solution and a base portion 40A of a concentration meter 40 which detects the concentration of the urea aqueous solution, are fastened respectively by means of screw bolts 42. The water gauge 38 is provided with an inner electrode and an outer electrode arranged in concentric, both of which have circular cross sections, to detect the level of the urea aqueous solution based on a change in electrostatic capacity between both electrodes, and a detecting section 38B comprised of the inner electrode and the outer electrode hangs from the base portion 38A toward the bottom portion of the container body 24A. On the other hand, the concentration meter 40 is for detecting the concentration of the urea aqueous solution based on a temperature transfer characteristic between two spaced points, and a detecting section 40B thereof hangs from the base portion 40A so that the detecting section 40B is positioned on the bottom portion of the container body 24A.

The inlet port 36C and the outlet port 36D for the engine coolant are fluidly interconnected via a heat exchanger 44 disposed in the container body 24A. The heat exchanger 44 is structured such that a pipe material of approximately U-shaped is bent so as to surround the water gauge 38 and the concentration meter 40 on the bottom portion of the container body 24A, and also, a tip bent portion 44A thereof is supported by a metallic bracket 46 fixed to the top lid 36. Thus, if the heat exchanger 44 is configured by bending the approximately U-shaped pipe material which provides a fluid interconnection between the inlet port 36 and the outlet port 36D for the engine coolant, the total length of the heat exchanger 44 in the reducing agent container is increased, so that the heat exchange with the liquid reducing agent can be efficiently performed.

Further, to a lower portion of the heat exchanger 44, a protector 48 of approximately box shape is secured, so as to protect the water gauge 38 and the concentration meter 40 from ice chips of the urea aqueous solution frozen in the reducing agent container 24. Thus, even if the ice chips of the urea aqueous solution move hard in the reducing agent container 24, for example, since the ice chips do not collide with the detecting section 40B of the concentration meter 40, it is possible to prevent occurrence of the failure due to breakage.

Figure 3:
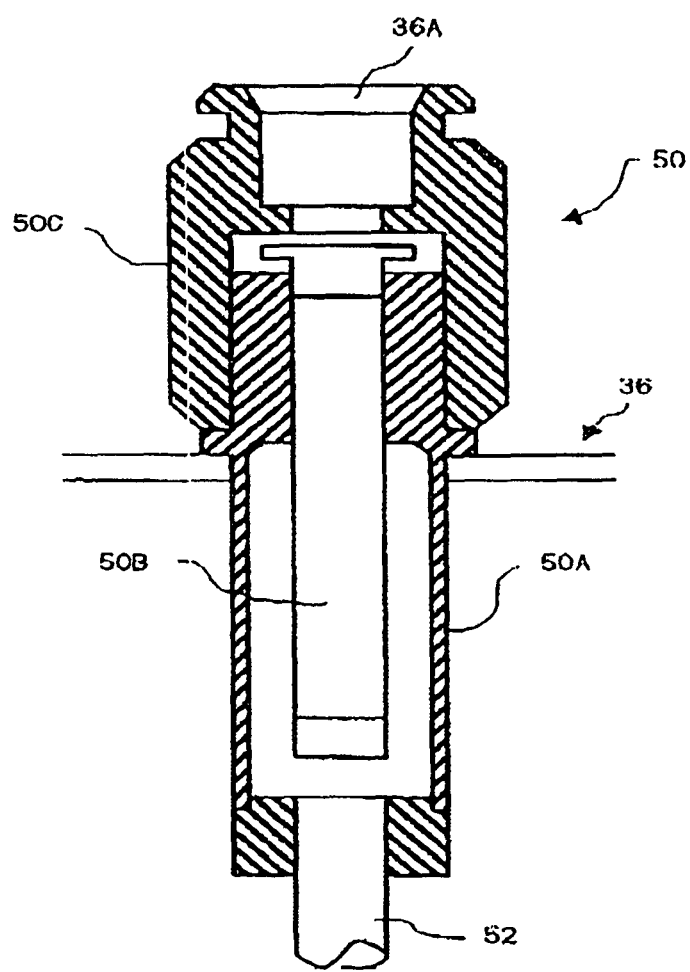
FIG. 3 is a longitudinal section view showing the details of a strainer according to an embodiment of the present invention.
Figure 4:
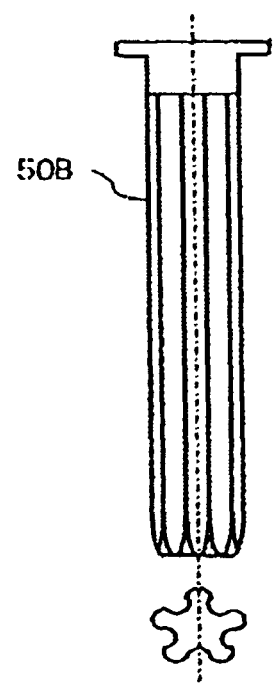
FIG. 4 is an explanatory diagram of a first embodiment showing a modified example of an element to be incorporated in the strainer of the reducing agent container according to the present invention.
Figure 5:
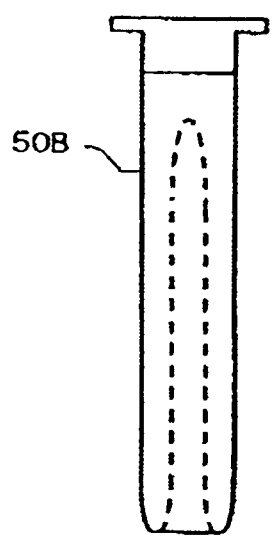
FIG. 5 is an explanatory diagram of a second embodiment showing a further modified example of the element.

Here, as a characteristic configuration of the present invention, there is provided a strainer 50 capable of filtrating foreign substances from the urea aqueous solutions so as to be attached to the supply port 36A for the urea aqueous solution, as shown in FIG. 3. The strainer 50 comprised of a case 50A of approximately cylindrical shape, which is mounted approximately in vertical to the top lid 36; a strainer element 50B detachably inserted into the case 50A from an upper end portion thereof; and a cap 50C detachably screwed on the upper end portion of the case 50A. To a lower end portion of the case 50A, a suction pipe 52 for sucking the urea aqueous solution from the bottom portion of the container body 24A is connected. As shown in FIG. 2, the suction pipe 52 is arranged so as to be along the pipe material connected to the inlet port 36C for the engine coolant, in order to perform the heat exchange with the heat exchanger 44. The strainer element 50B has a cross section of approximately circular shape, and a flange for restricting the insertion length in the case 50A is formed on a base end portion of the strainer element 50B. Incidentally, in order to efficiently filtrate the foreign substances, the element 50B may be formed in a shape which increases a filtrating area, for example as shown in FIG. 4, an approximately star shape in which parts of profile forming the cross section are concaved inwardly, or for example as shown in FIG. 5, a shape in which a tip end portion thereof in an axial direction is concaved toward the base end portion thereof. Further, on a head portion of the cap 50C, the supply port 36A for the urea aqueous solution, that is, a connecting portion of the supply piping 26, is formed.

Figure 6:
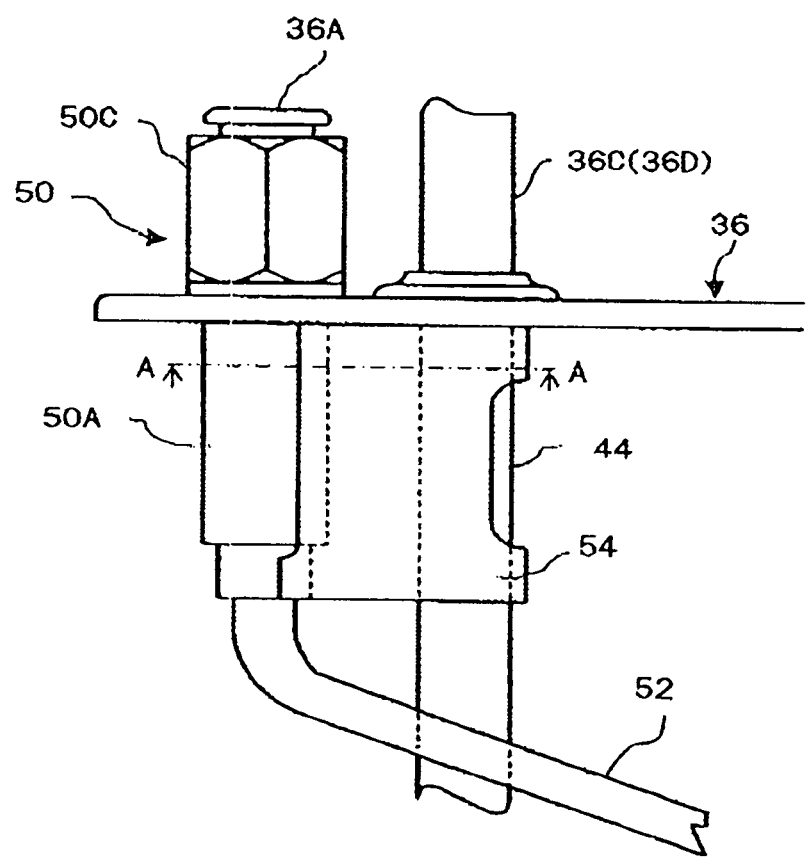
FIG. 6 is a front view of a connecting member which connects between the strainer and a heat exchanger.
Figure 7:
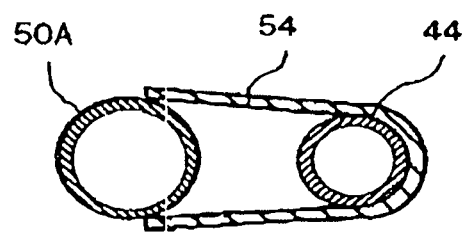
FIG. 7 is an essential part cross-sectional view of the connecting member, taken along the line A-A of FIG. 6.

Further, as shown in FIG. 6, in the container body 24A, the case 50A of the strainer 50 may be connected, by means of a connecting member 54 formed of a metallic plate, to the pipe material constituting the heat exchanger 44, to be specific, to the pipe material connected to the inlet port 36A for the engine coolant for efficiently utilizing a heat quantity of the engine coolant (heating medium inlet side piping). At this time, it is desirable that the connecting member 54 is specifically formed to have a shape for confining a closed cross-sectional area between the strainer 50 and the heat exchanger 44, more specifically, a shape having a cross section of approximately U-shaped, as shown in FIG. 7. Thus, since the urea aqueous solution in the strainer 50 is heated with the heat transferring from the heat exchanger 44 to the strainer 50, and therefore, for example, even if the cap 50C of the strainer 50 is exposed to the wind during traveling of a vehicle, the freezing of the urea aqueous solution is prevented. Furthermore, if the closed cross section is formed between the strainer 50 and the heat exchanger 44 by means of the connecting member 54, since the heat from the heat exchanger 44 is confined in the closed cross-sectional area, it becomes possible to efficiently heat the strainer 50, to thereby achieve the effective suppressing of freezing of the urea aqueous solution.

According to such a reducing agent container 24, since the strainer 50 which filtrates the foreign substances from the urea aqueous solution is integrated with the top lid 36, the whole of strainer 50 is not exposed to the outside air, especially, the wind during traveling of a vehicle, and accordingly, the freezing of the urea aqueous solution in the strainer 50 can be suppressed. Therefore, even in a cold weather area, there is a less possibility that the urea aqueous solution becomes unable to be injection-supplied, and a function of the exhaust emission purifying apparatus can be ensured. Consequently, it is possible to achieve the effective filtration of the urea aqueous solution while suppressing the freezing thereof.

Figure 8:
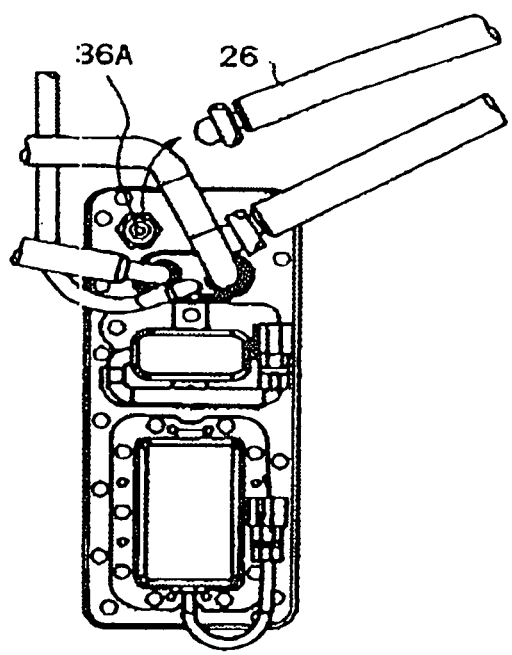
FIG. 8 is an explanatory diagram of a first process showing an element cleaning method.
Figure 9:
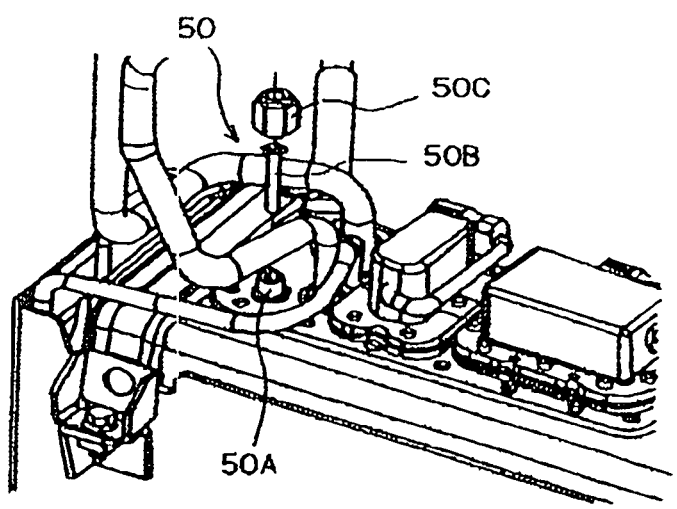
FIG. 9 is an explanatory diagram of a second process showing the element cleaning method.

Further, the foreign substances filtrated by the strainer element 50B of the strainer 50 can be removed in a manner as sot forth below. Namely, as shown in FIG. 8, the supply piping 26 is detached from the supply port 36A for the urea aqueous solution. Then, as shown in FIG. 9, the cap 50C of the strainer 50 is detached, and the strainer element 50B inserted into the case 50A is removed upwardly. And then, the foreign substances attached to the strainer element 50B is washed off with water and the like, and thereafter, the strainer element 50B is re-inserted and set in the case 50A, and the cap 50C is screwed to be fixed to the upper end portion of the case 50A.

Therefore, the strainer element 50B is detachable only by detaching the cap 50C of the strainer 50 without the necessity of disassembling the reducing agent container 24, and also, the foreign substances filtrated in the strainer 50 can be easily removed. Then, the cleaning of the strainer element 50B is easily performed, and a foreign substance filtrating function by the strainer 50 can be constantly and stably maintained.

At this stage, it is to be noted that the present invention can be applied to not only the exhaust emission purifying apparatus using the urea aqueous solution as the liquid reducing agent, but also those apparatuses using gasoline, light oil, alcohol and the like including hydrocarbon as main component thereof, as the liquid reducing agent.

Further, it should be appreciated that the entire contents of Japanese Patent Application No. 2004-303462 filed on Oct. 18, 2004, on which the convention priority is claimed is incorporated herein by reference. It should also be understood that many modifications and variations of the described embodiments of the invention will occur to a person having an ordinary skill in the art without departing from the spirit and scope of the present invention as claimed in the appended claims.

We claim:

1. A reducing agent container having an improved function and including a container body thereof comprising:
    a heat exchanger configured to permit a heating medium using an engine as a heat source thereof to circulate therein for performing the heat exchange with a liquid reducing agent, the heat exchanger being attached to a top board of the container body;
    a strainer configured to filtrate foreign substances from the liquid reducing agent, the strainer being also attached to the top board of the container body; and
    a suction pipe connected to the strainer and configured to suck the liquid reducing agent from an inside of the container body,
    wherein the strainer has a supply port formed therein for permitting the liquid reducing agent from which foreign substances are filtrated to be supplied therethrough,
    wherein the strainer and the heat exchanger are connected to each other by a connecting member formed of a metal plate, in the inside of the container body, and
    wherein the connecting member connects the strainer to only a heating medium inlet side piping of the heat exchanger.

2. The reducing agent container according to claim 1, wherein the connecting member has a shape which enables forming of a closed cross section between the strainer and the heat exchanger.

3. The reducing agent container according to claim 1, wherein the strainer comprises:
    a case thereof having a substantially cylindrical shape, the case being mounted in substantially vertical on the top board; an element detachably inserted into the case from an upper end portion of the case; and
    a cap detachably screwed on an upper end portion of the case.

4. The reducing agent container according to claim 3, wherein the element has a shape in which a tip end portion thereof in an axial direction is concaved toward a base end portion thereof.

5. The reducing agent container according to claim 3, wherein the element has a shape in which parts of profile forming a cross section thereof are concaved inwardly.

* * * * *